US011736908B2

(12) United States Patent
Byun et al.

(10) Patent No.: US 11,736,908 B2
(45) Date of Patent: Aug. 22, 2023

(54) SWITCHING BETWEEN UNICAST AND MULTICAST BY CONSIDERING DEGRADED USER EXPERIENCE IN A WIRELESS COMMUNICATION SYSTEM

(71) Applicant: LG ELECTRONICS INC., Seoul (KR)

(72) Inventors: Daewook Byun, Seoul (KR); Sunghoon Jung, Seoul (KR); Jian Xu, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/784,982

(22) PCT Filed: Dec. 31, 2020

(86) PCT No.: PCT/KR2020/019300
§ 371 (c)(1),
(2) Date: Jun. 13, 2022

(87) PCT Pub. No.: WO2021/149933
PCT Pub. Date: Jul. 29, 2021

(65) Prior Publication Data
US 2023/0007444 A1    Jan. 5, 2023

(30) Foreign Application Priority Data

Jan. 23, 2020  (KR) .......................... 10-2020-0009535

(51) Int. Cl.
*H04W 76/10*    (2018.01)
*H04W 4/06*    (2009.01)
(Continued)

(52) U.S. Cl.
CPC ............. *H04W 4/06* (2013.01); *H04L 1/1607* (2013.01); *H04W 76/10* (2018.02); *H04L 12/189* (2013.01)

(58) Field of Classification Search
CPC ...... H04W 4/06; H04W 76/10; H04L 1/1607; H04L 12/189
(Continued)

(56) References Cited

U.S. PATENT DOCUMENTS 8,111,710 B2 *  2/2012  Cheng ................... H04L 1/1685
                                                          370/465
8,175,069 B2    5/2012  Wang et al.
(Continued)

FOREIGN PATENT DOCUMENTS

KR    1020190008384    1/2019
WO    2019179602    9/2019

OTHER PUBLICATIONS

Tencent, New Solution for mode switching between unicast and multicast, S2-2000605, 3GPP TSG SA WG2 Meeting #136 Adhoc, Incheon, Korea, Jan. 7, 2020, sections 1-2.3.
(Continued)

Primary Examiner — Christopher R Crompton
(74) Attorney, Agent, or Firm — Dentons US LLP

(57) ABSTRACT

A method and apparatus for switching between unicast and multicast by considering degraded user experience in a wireless communication system is described. A CU of a RAN node receives, from the DU, a first switching message including status of the MBS for each of the first wireless device and the second wireless device. A CU of a RAN node determines to switch the first transmission to a third transmission only for the first wireless device for the MBS, based on the received status of the MBS.

20 Claims, 15 Drawing Sheets

(51) Int. Cl.
  *H04L 1/1607* (2023.01)
  *H04L 12/18* (2006.01)
(58) Field of Classification Search
  USPC .......................................................... 370/312
  See application file for complete search history.

(56) References Cited

U.S. PATENT DOCUMENTS

| 9,166,808 B2 | 10/2015 | Gou et al. |
| 2013/0083720 A1 | 4/2013 | Wang et al. |

OTHER PUBLICATIONS

Vivo et al., Solution for unicast switch to multicast based on network control, S2-2001358, SA WG2 Meeting #136AH, SA WG2 Temporary Document, Jan. 13, 2020, p. 3.
AT&T, Status update on Rel-17 5MBS work in 3GPP and potential impacts on public safety, S6-200059, 3GPP TSG-SA6 Meeting #34, Hyderabad, India, Jan. 16, 2020, section 2.4.
Section 8.2 of 3GPP TS 38.413 v16.0.0.
Section 8.3 of 3GPP TS 38.473 v16.0.0.
Section 8.2 of 3GPP TS 38.463 v16.0.0.
Section 8.3 of 3GPP TS 38.463 v16.0.0.

\* cited by examiner

SWITCHING BETWEEN UNICAST AND MULTICAST BY CONSIDERING DEGRADED USER EXPERIENCE IN A WIRELESS COMMUNICATION SYSTEM

This application is the National Stage filing under 35 U.S.C. 371 of International Application No. PCT/KR2020/019300 filed on Dec. 31, 2020, which claims priority to Korean Patent Application No. 10-2020-0009535 filed on Jan. 23, 2020, the contents of which are all hereby incorporated by reference herein in their entirety.

BACKGROUND

Technical Field

The present disclosure relates to a method and apparatus for switching between unicast and multicast by considering degraded user experience in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

In NR, Multicast and/or Broadcast Services (MBS) is provided for wireless devices in a connected state. A wireless device may receive MBS via multicast transmission or unicast transmission from a network. Multicast transmission may be referred as a point to multipoint (PTM) transmission. Unicast transmission may be referred as point to point (PTP) transmission.

A network may need to perform dynamic change of multicast and/or broadcast service delivery between multicast transmission and unicast transmission with service continuity for a wireless device in a connected state.

However, when multiple wireless devices receives the MBS, one or more wireless devices could become far from a serving cell, or be located in the cell edge. In this case, user experiences of the one or more wireless device could be degraded. For example, it would be better to assign a unicast channel to those wireless devices.

Therefore, studies for switching between unicast and multicast by considering degraded user experience in a wireless communication system are needed.

Technical Solutions

In an aspect, a method performed by a Central Unit (CU) of a Radio Access Network (RAN) node in a wireless communication system is provided. A CU of a RAN node provides, via the DU, the MBS to the first wireless device by using a first transmission. A CU of a RAN node provides, via the DU, the MBS to the second wireless device by using a second transmission. A CU of a RAN node receives, from the DU, a first switching message including status of the MBS for each of the first wireless device and the second wireless device. A CU of a RAN node determines to switch the first transmission to a third transmission only for the first wireless device for the MBS, based on the received status of the MBS. A CU of a RAN node provides, via the DU, the MBS by using the third transmission to the first wireless device.

In another aspect, an apparatus for implementing the above method is provided.

Technical Effects

The present disclosure may have various advantageous effects.

According to some embodiments of the present disclosure, a Radio Access Network (RAN) node (for example, a base station such as an eNB or a gNB) could efficiently switch between unicast and multicast for multicast and/or broad cast service (MBS) by considering degraded user experience.

For example, a gNB-Central Unit (CU) could perform switching efficiently between unicast and multicast for the MBS based on the information on layer 1 status and/or layer 2 status and radio utilization efficiency provided from a gNB-Distributed Unit (DU).

For example, by considering the layer 1 status and/or the layer 2 status information, it is possible to perform switching for a part of UEs receiving the same MBS.

Therefore, the RAN node could use radio resource for the MBS efficiently. In addition, the RAN node could avoid the degradation of user experiences by switching between unicast and multicast.

According to some embodiments of the present disclosure, a wireless communication system could provide an efficient solution for dynamic change of MBS delivery between multicast and unicast with service continuity by considering degraded user experience.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
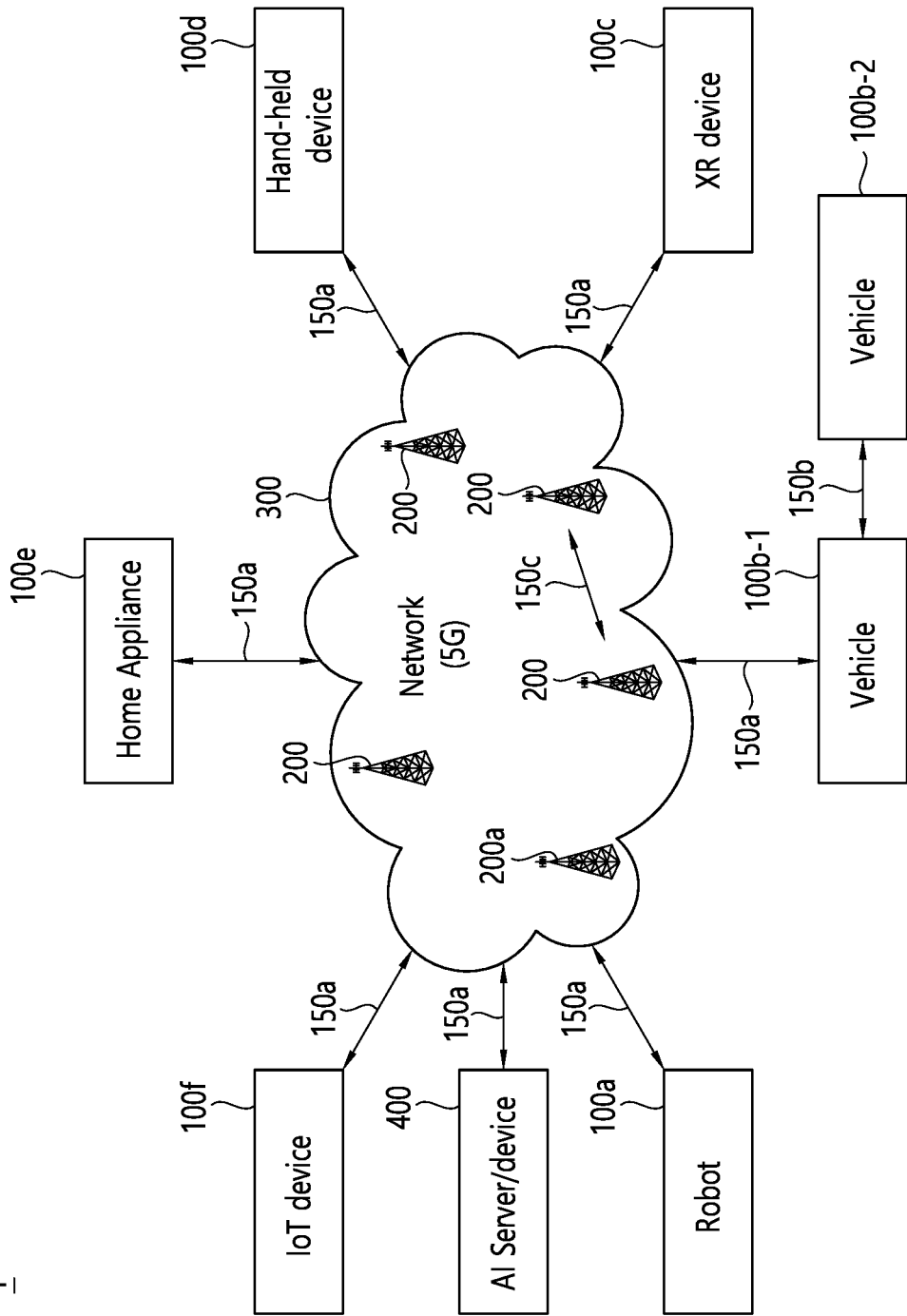
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified.

Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
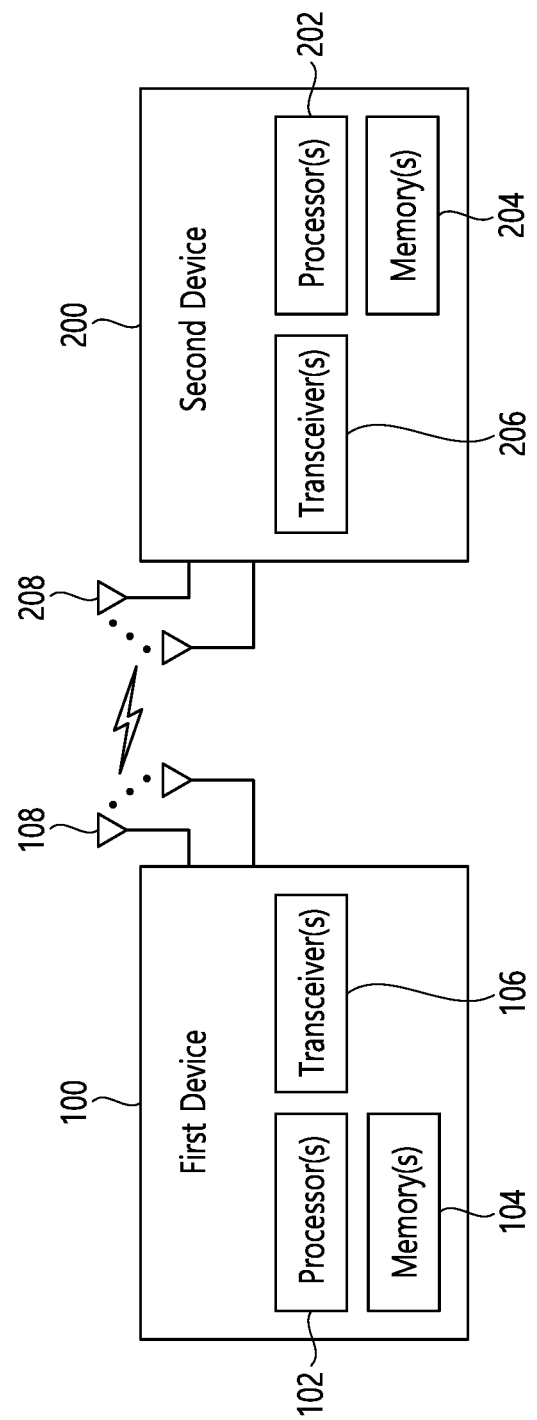
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
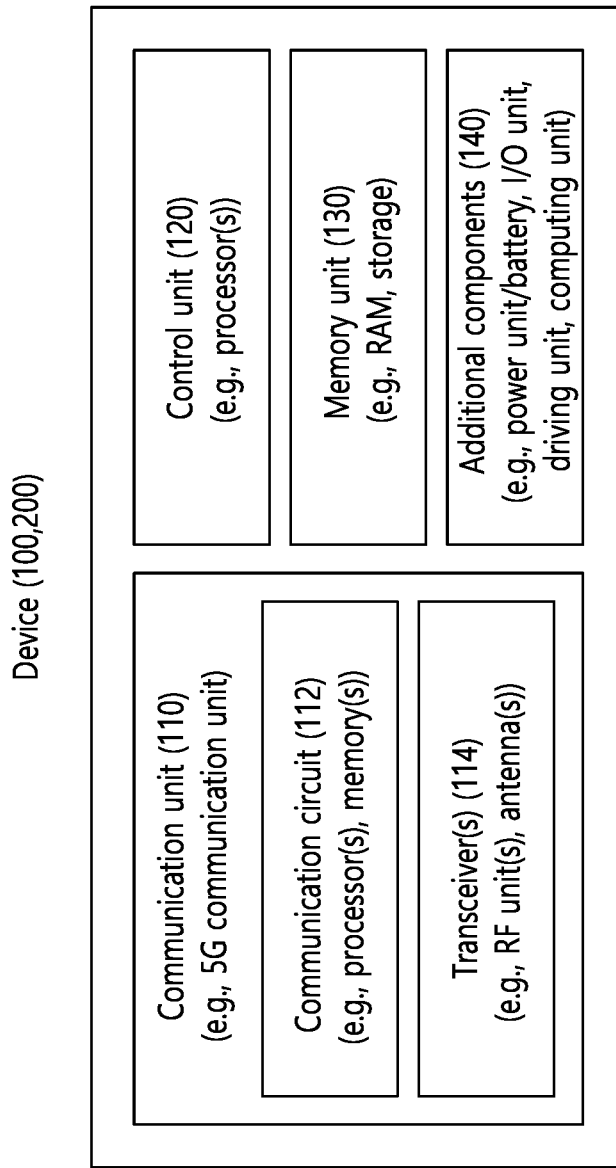
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
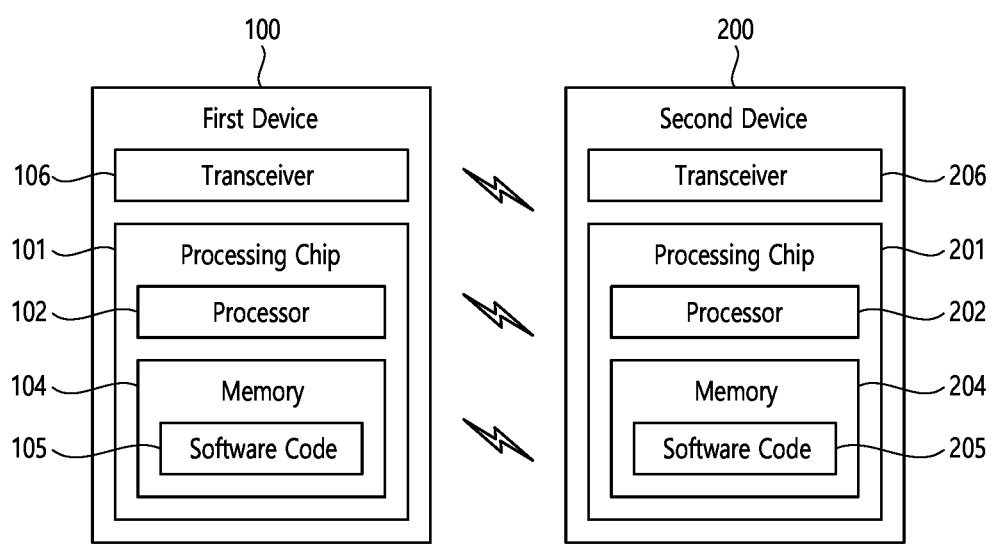
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
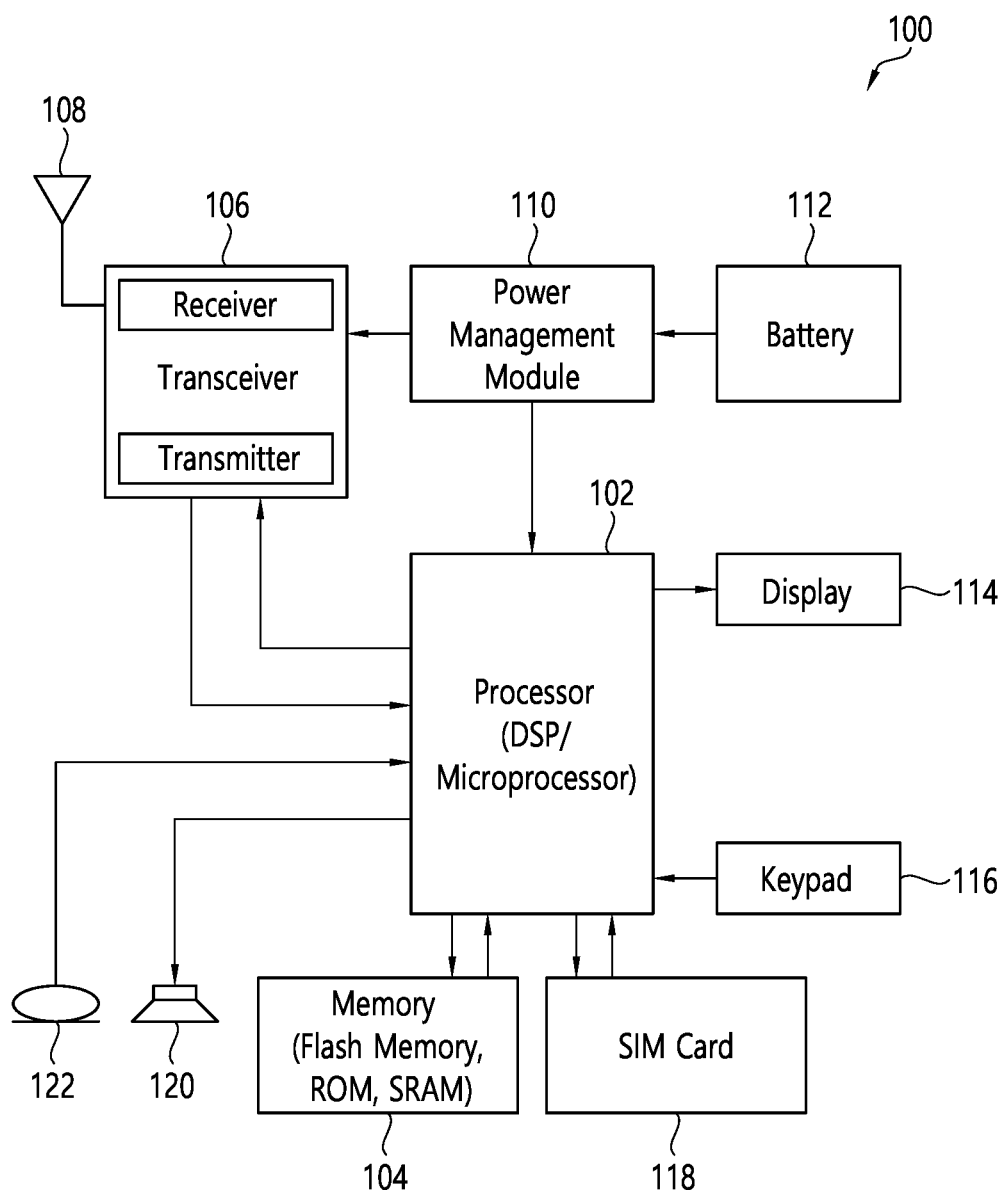
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
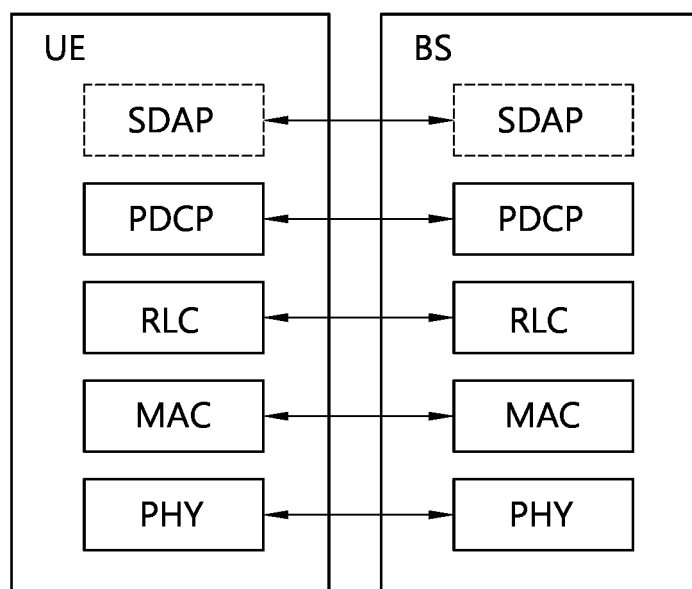
FIGS. 6 and 7 show an example of protocol stacks in a 3GPP based wireless communication system to which implementations of the present disclosure is applied.
Figure 7:
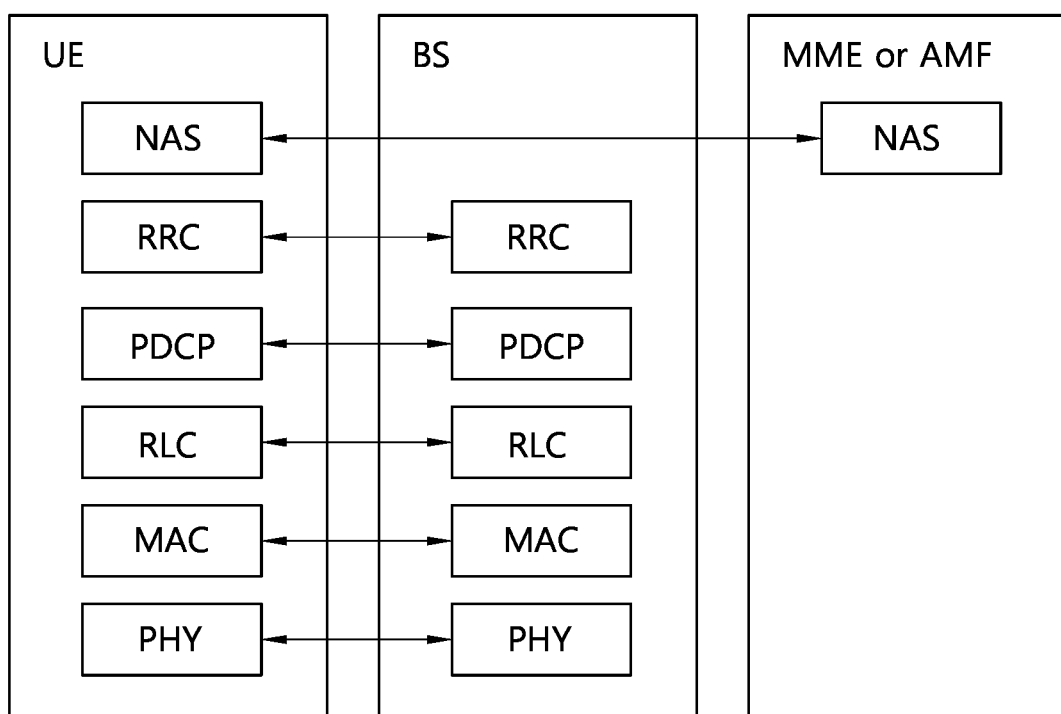

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
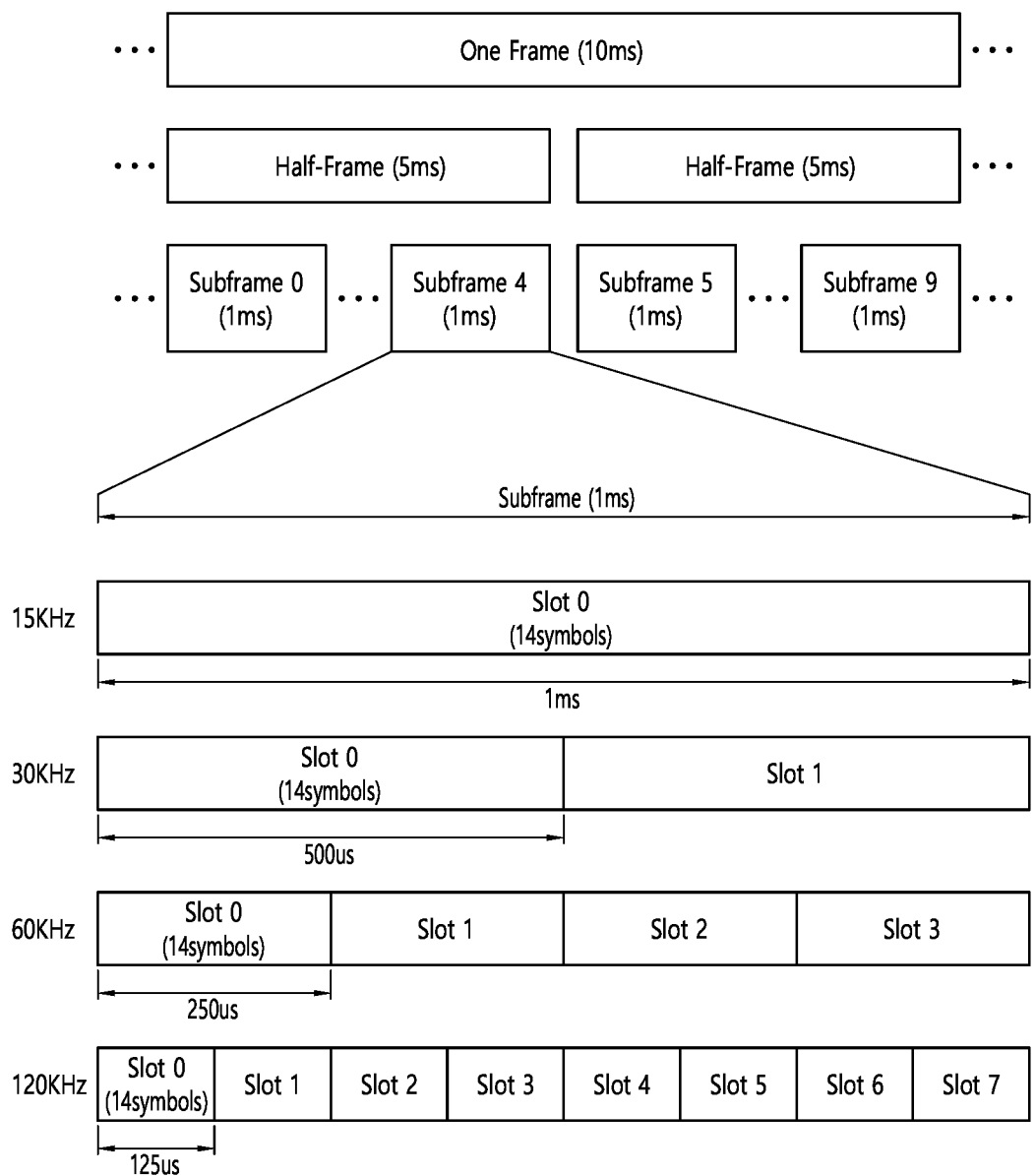
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
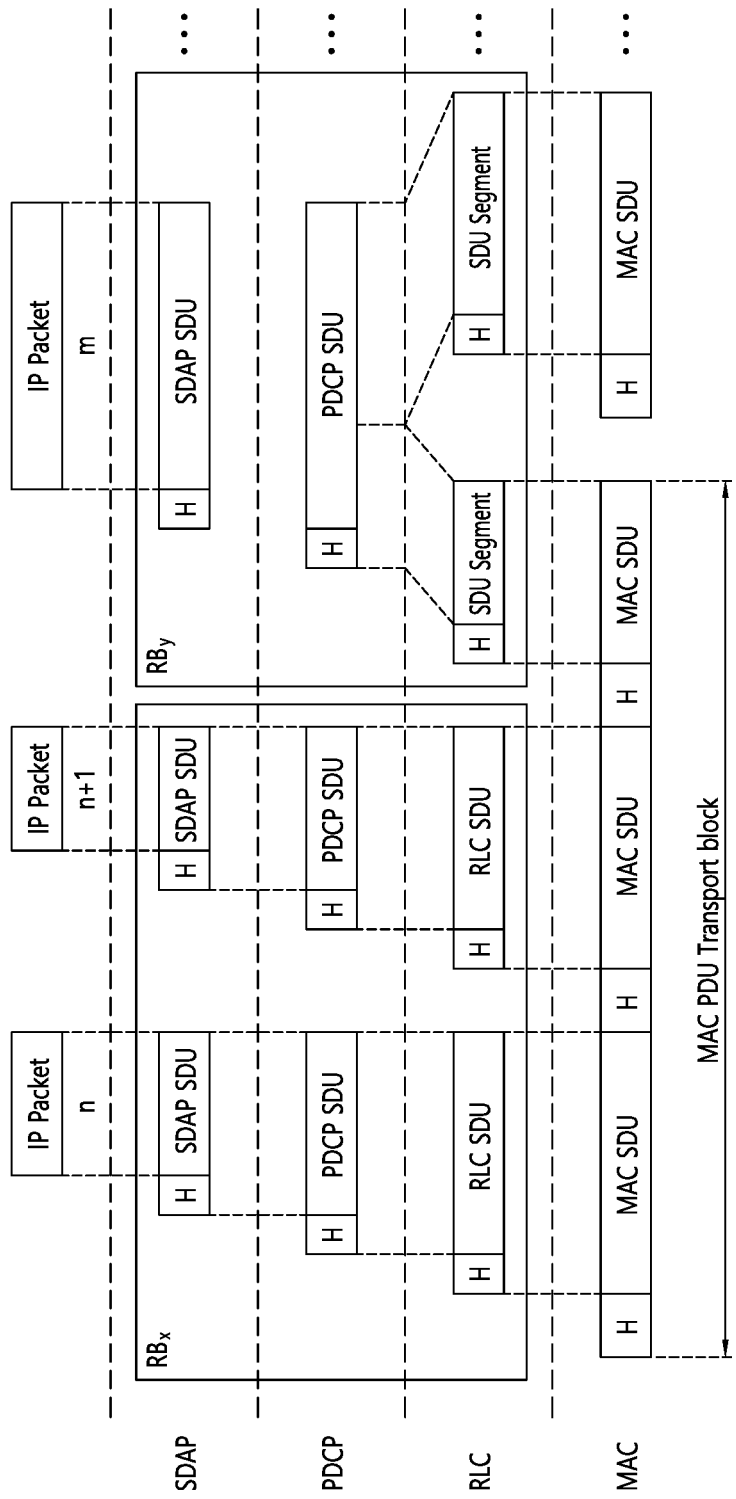
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Figure 10:
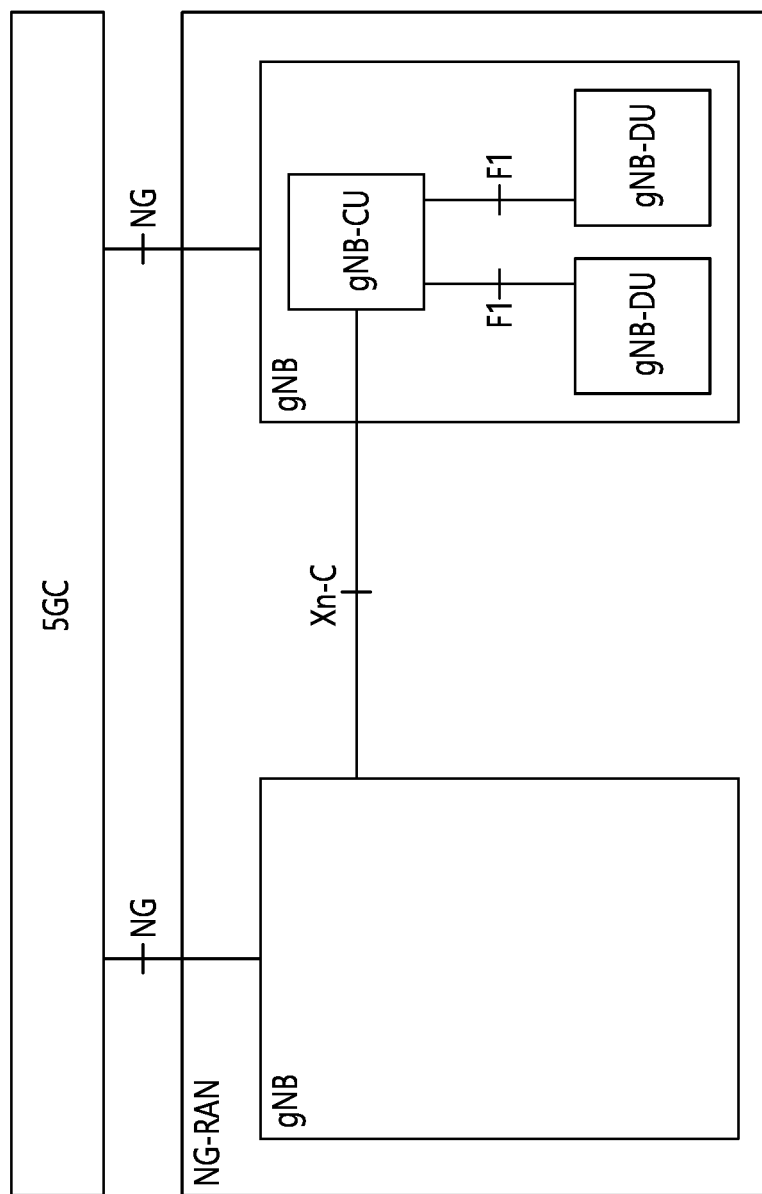
FIG. 10 shows an example of the overall architecture of an NG-RAN to which technical features of the present disclosure can be applied.

FIG. 10 shows an example of the overall architecture of an NG-RAN to which technical features of the present disclosure can be applied.

Referring to FIG. 10, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 11:
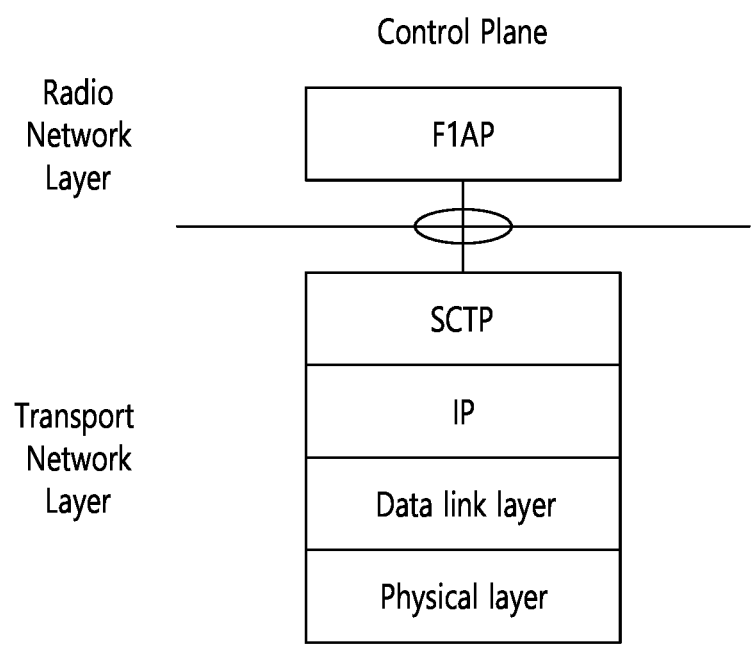
FIG. 11 shows an interface protocol structure for F1-C to which technical features of the present disclosure can be applied.

FIG. 11 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Hereinafter, PDU Session Resource Setup and PDU Session Resource Modify are described. Section 8.2 of 3GPP TS 38.413 v16.0.0 may be referred.

PDU Session Resource Setup is described.

The purpose of the PDU Session Resource Setup procedure is to assign resources on Uu and NG-U for one or several PDU sessions and the corresponding QoS flows, and to setup corresponding DRBs for a given UE. The procedure uses UE-associated signalling.

The AMF initiates the procedure by sending a PDU SESSION RESOURCE SETUP REQUEST message to the NG-RAN node.

The PDU SESSION RESOURCE SETUP REQUEST message shall contain the information required by the NG-RAN node to setup the PDU session related NG-RAN configuration consisting of at least one PDU session resource and include each PDU session resource to setup in the PDU Session Resource Setup Request List IE.

Upon reception of the PDU SESSION RESOURCE SETUP REQUEST message, if resources are available for the requested configuration, the NG-RAN node shall execute the requested NG-RAN configuration and allocate associated resources over NG and over Uu for each PDU session listed in the PDU Session Resource Setup Request List IE.

PDU Session Resource Modify is described.

The purpose of the PDU Session Resource Modify procedure is to enable configuration modifications of already established PDU session(s) for a given UE. It is also to enable the setup, modification and release of the QoS flow for already established PDU session(s). The procedure uses UE-associated signalling.

The AMF initiates the procedure by sending a PDU SESSION RESOURCE MODIFY REQUEST message to the NG-RAN node.

The PDU SESSION RESOURCE MODIFY REQUEST message shall contain the information required by the NG-RAN node, which may trigger the NG-RAN configuration modification for the existing PDU sessions listed in the PDU Session Resource Modify Request List IE.

Upon reception of the PDU SESSION RESOURCE MODIFY REQUEST message, if the NG-RAN configuration is triggered to be modified and if resources are available for the modified NG-RAN configuration, the NG-RAN node shall execute the configuration modification for the requested PDU session.

Hereinafter, UE Context Setup and UE Context Modification (gNB-CU initiated) are described. Section 8.3 of 3GPP TS 38.473 v16.0.0 may be referred.

UE Context Setup is described.

The purpose of the UE Context Setup procedure is to establish the UE Context including, among others, SRB, and DRB configuration. The procedure uses UE-associated signalling.

The gNB-CU initiates the procedure by sending UE CONTEXT SETUP REQUEST message to the gNB-DU. If the gNB-DU succeeds to establish the UE context, it replies to the gNB-CU with UE CONTEXT SETUP RESPONSE. If no UE-associated logical F1-connection exists, the UE-associated logical F1-connection shall be established as part of the procedure.

The gNB-DU shall report to the gNB-CU, in the UE CONTEXT SETUP RESPONSE message, the result for all the requested DRBs and SRBs in the following way:
  A list of DRBs which are successfully established shall be included in the DRB Setup List IE;
  A list of DRBs which failed to be established shall be included in the DRB Failed to Setup List IE;
  A list of SRBs which failed to be established shall be included in the SRB Failed to Setup List IE.
  A list of successfully established SRBs with logical channel identities for primary path shall be included in the SRB Setup List IE only if CA based PDCP duplication is initiated for the concerned SRBs.

When the gNB-DU reports the unsuccessful establishment of a DRB or SRB, the cause value should be precise enough to enable the gNB-CU to know the reason for the unsuccessful establishment.

If the C-RNTI IE is included in the UE CONTEXT SETUP RESPONSE, the gNB-CU shall consider that the C-RNTI has been allocated by the gNB-DU for this UE context.

If the UE CONTEXT SETUP REQUEST message contains the RRC-Container IE, the gNB-DU shall send the corresponding RRC message to the UE via SRB1.

If the RAN UE ID IE is contained in the UE CONTEXT SETUP REQUEST message, the gNB-DU shall store and replace any previous information received.

UE Context Modification (gNB-CU initiated) is described.

The purpose of the UE Context Modification procedure is to modify the established UE Context, e.g., establishing, modifying and releasing radio resources. This procedure is also used to command the gNB-DU to stop data transmission for the UE for mobility. The procedure uses UE-associated signalling.

The UE CONTEXT MODIFICATION REQUEST message is initiated by the gNB-CU.

Upon reception of the UE CONTEXT MODIFICATION REQUEST message, the gNB-DU shall perform the modifications, and if successful reports the update in the UE CONTEXT MODIFICATION RESPONSE message.

The gNB-DU shall report to the gNB-CU, in the UE CONTEXT MODIFICATION RESPONSE message, the result for all the requested or modified DRBs and SRBs in the following way:
  A list of DRBs which are successfully established shall be included in the DRB Setup List IE;
  A list of DRBs which failed to be established shall be included in the DRB Failed to be Setup List IE;
  A list of DRBs which are successfully modified shall be included in the DRB Modified List IE;
  A list of DRBs which failed to be modified shall be included in the DRB Failed to be Modified List IE;
  A list of SRBs which failed to be established shall be included in the SRB Failed to be Setup List IE.
  A list of successfully established SRBs with logical channel identities for primary path shall be included in the SRB Setup List IE only if CA based PDCP duplication is initiated for the concerned SRBs.
  A list of successfully modified SRBs with logical channel identities for primary path shall be included in the SRB Modified List IE only if CA based PDCP duplication is initiated for the concerned SRBs.

When the gNB-DU reports the unsuccessful establishment of a DRB or SRB, the cause value should be precise enough to enable the gNB-CU to know the reason for the unsuccessful establishment.

If the C-RNTI IE is included in the UE CONTEXT MODIFICATION RESPONSE, the gNB-CU shall consider that the C-RNTI has been allocated by the gNB-DU for this UE context.

If the UE CONTEXT MODIFICATION REQUEST message contains the RRC-Container IE, the gNB-DU shall send the corresponding RRC message to the UE. If the UE CONTEXT MODIFICATION REQUEST message includes the Execute Duplication IE, the gNB-DU shall perform CA based duplication, if configured, for the SRB for the included RRC-Container IE.

Hereinafter, gNB-CU-CP Configuration Update, Bearer Context Setup and Bearer Context Modification (gNB-CU-CP initiated) are described. Sections 8.2 and 8.3 of 3GPP TS 38.463 v16.0.0 may be referred.

gNB-CU-CP Configuration Update is described.

The purpose of the gNB-CU-CP Configuration Update procedure is to update application level configuration data needed for the gNB-CU-CP and the gNB-CU-UP to interoperate correctly on the E1 interface. This procedure does not affect existing UE-related contexts, if any. The procedure uses non-UE associated signalling.

The gNB-CU-CP initiates the procedure by sending a GNB-CU-CP CONFIGURATION UPDATE message to the gNB-CU-UP including an appropriate set of updated configuration data that it has just taken into operational use. The gNB-CU-UP responds with GNB-CU-CP CONFIGURATION UPDATE ACKNOWLEDGE message to acknowledge that it successfully updated the configuration data. If an information element is not included in the GNB-CU-CP CONFIGURATION UPDATE message, the gNB-CU-UP shall interpret that the corresponding configuration data is not changed and shall continue to operate with the existing related configuration data.

The updated configuration data shall be stored in both nodes and used as long as there is an operational TNL association or until any further update is performed.

Bearer Context Setup is described.

The purpose of the Bearer Context Setup procedure is to allow the gNB-CU-CP to establish a bearer context in the gNB-CU-UP. The procedure uses UE-associated signalling.

The gNB-CU-CP initiates the procedure by sending the BEARER CONTEXT SETUP REQUEST message to the gNB-CU-UP. If the gNB-CU-UP succeeds to establish the requested resources, it replies to the gNB-CU-CP with the BEARER CONTEXT SETUP RESPONSE message.

The gNB-CU-UP shall report to the gNB-CU-CP, in the BEARER CONTEXT SETUP RESPONSE message, the result for all the requested resources in the following way:

For E-UTRAN:
A list of DRBs which are successfully established shall be included in the DRB Setup List IE;
A list of DRBs which failed to be established shall be included in the DRB Failed List IE;

For NG-RAN:
A list of PDU Session Resources which are successfully established shall be included in the PDU Session Resource Setup List IE;
A list of PDU Session Resources which failed to be established shall be included in the PDU Session Resource Failed List IE;
For each established PDU Session Resource, a list of DRBs which are successfully established shall be included in the DRB Setup List IE;
For each established PDU Session Resource, a list of DRBs which failed to be established shall be included in the DRB Failed List IE;
For each established DRB, a list of QoS Flows which are successfully established shall be included in the Flow Setup List IE;
For each established DRB, a list of QoS Flows which failed to be established shall be included in the Flow Failed List IE;

When the gNB-CU-UP reports the unsuccessful establishment of a PDU Session Resource, DRB or QoS Flow the cause value should be precise enough to enable the gNB-CU-CP to know the reason for the unsuccessful establishment.

Bearer Context Modification (gNB-CU-CP initiated) is described.

The purpose of the Bearer Context Modification procedure is to allow the gNB-CU-CP to modify a bearer context in the gNB-CU-UP. The procedure uses UE-associated signalling.

The gNB-CU-CP initiates the procedure by sending the BEARER CONTEXT MODIFICATION REQUEST message to the gNB-CU-UP. If the gNB-CU-UP succeeds to modify the bearer context, it replies to the gNB-CU-CP with the BEARER CONTEXT MODIFICATION RESPONSE message.

The gNB-CU-UP shall report to the gNB-CU-CP, in the BEARER CONTEXT MODIFICATION RESPONSE message, the result for all the requested resources in the following way:

For E-UTRAN:
A list of DRBs which are successfully established shall be included in the DRB Setup List IE;
A list of DRBs which failed to be established shall be included in the DRB Failed List IE;
A list of DRBs which are successfully modified shall be included in the DRB Modified List IE;
A list of DRBs which failed to be modified shall be included in the DRB Failed To Modify List IE;

For NG-RAN:
A list of PDU Session Resources which are successfully established shall be included in the PDU Session Resource Setup List IE;
A list of PDU Session Resources which failed to be established shall be included in the PDU Session Resource Failed List IE;
A list of PDU Session Resources which are successfully modified shall be included in the PDU Session Resource Modified List IE;
A list of PDU Session Resources which failed to be modified shall be included in the PDU Session Resource Failed To Modify List IE;
For each successfully established or modified PDU Session Resource, a list of DRBs which are successfully established shall be included in the DRB Setup List IE;
For each successfully established or modified PDU Session Resource, a list of DRBs which failed to be established shall be included in the DRB Failed List IE;
For each successfully modified PDU Session Resource, a list of DRBs which are successfully modified shall be included in the DRB Modified List IE;
For each successfully modified PDU Session Resource, a list of DRBs which failed to be modified shall be included in the DRB Failed To Modify List IE;
For each successfully established or modified DRB, a list of QoS Flows which are successfully established shall be included in the Flow Setup List IE;
For each successfully established or modified DRB, a list of QoS Flows which failed to be established shall be included in the Flow Failed List IE;

When the gNB-CU-UP reports the unsuccessful establishment of a PDU Session Resource, DRB or QoS Flow the cause value should be precise enough to enable the gNB-CU-CP to know the reason for the unsuccessful establishment.

Meanwhile, in NR, Multicast and/or Broadcast Services (MBS) is provided for wireless devices in a connected state. A wireless device may receive MBS via multicast transmission or unicast transmission from a network. Multicast transmission may be referred as a point to multipoint (PTM) transmission. Unicast transmission may be referred as point to point (PTP) transmission.

It may be assumed that the necessary coordination function resides in the gNB-CU. In particular, in NR, the support for dynamic change of multicast and/or broadcast service delivery between multicast and unicast with service continuity for a UE in a connected state would be considered.

To develop the solution for this support, it is important to consider the case that a part of UEs, to which multicast and/or broadcast channel for the multicast and/or broadcast service is provided, are far from the UEs or are located in the cell edge. In this case, user experiences for these UEs may be degraded. It would be better to assign the unicast channel to these UEs.

Thus, solutions for considering that the unicast channel can be allocated to the UE(s), of which user experience are degraded.

Therefore, studies for switching between unicast and multicast by considering degraded user experience in a wireless communication system are needed.

Hereinafter, a method for switching between unicast and multicast by considering degraded user experience in a wireless communication system, according to some embodiments of the present disclosure, will be described.

Figure 12:
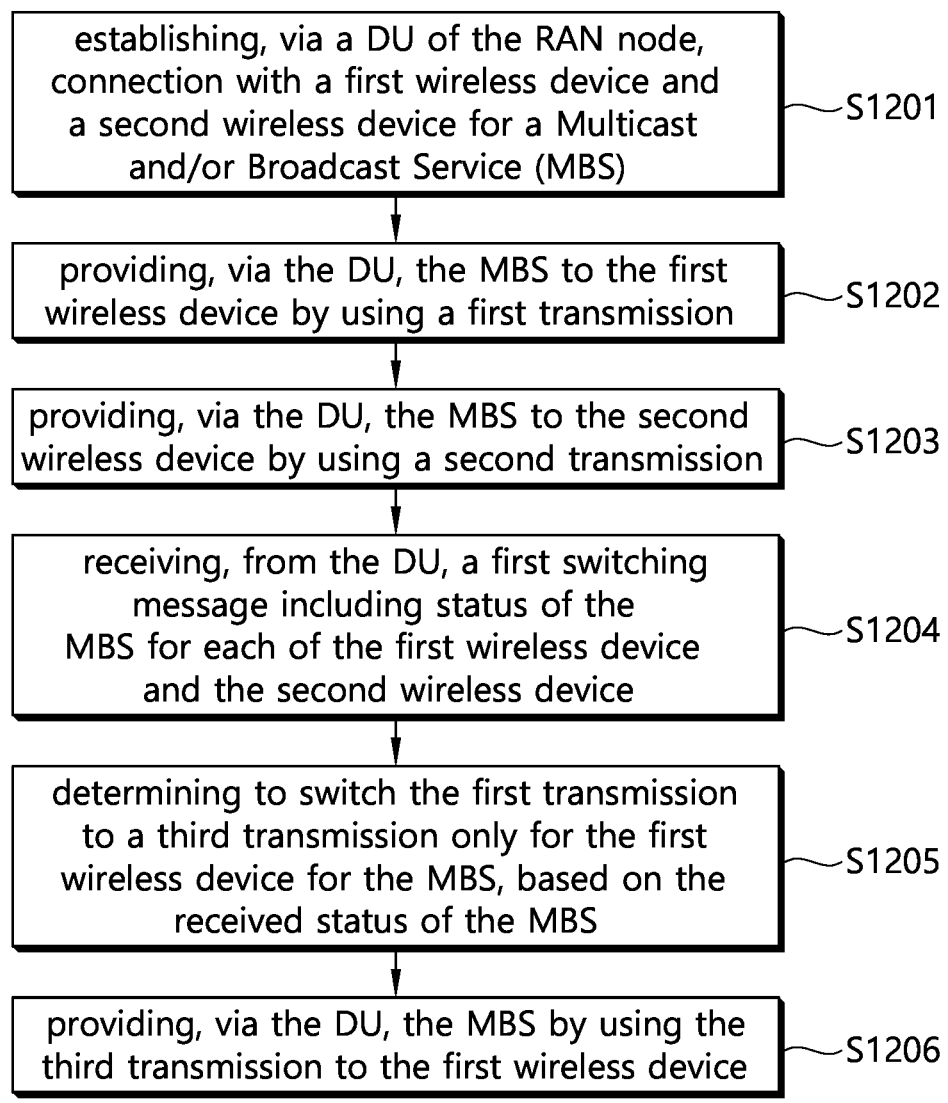
FIG. 12 shows an example of a method for switching between unicast and multicast by considering degraded user experience in a wireless communication system.

FIG. 12 shows an example of a method for switching between unicast and multicast by considering degraded user experience in a wireless communication system.

In particular, FIG. 12 shows an example of a method performed by a Central Unit (CU) of a Radio Access Network (RAN) node in a wireless communication system.

For example, the RAN node may be connected to a core network node (for example, Access and Mobility Function (AMF)) in the wireless communication system. For example, the RAN node may include a Distributed Unit (DU) connected to the CU.

In step S1201, the CU may establishing, via a DU of the RAN node, connection with a first wireless device and a second wireless device for a Multicast and/or Broadcast Service (MBS).

For example, the CU may receive, from a core network node (for example, an AMF), a Packet Data Unit (PDU) Session Resource Setup Request message or a PDU Session Resource Modify Request message to establish the connection with the first wireless device and the second wireless device for the MBS.

For example, the PDU Session Resource Setup Request message or the PDU Session Resource Modify Request message may include information for the MBS. For example, the information for the MBS may include at least one of a service identity (ID), Tunnel Endpoint Identifier (TEID) for the MBS, and/or flow identity of the MBS. For example, the flow identity of the MBS may indicate the MBS provided through the PDU session or QoS flow to be established.

For example, the CU may transmit, to the DU, a UE Context Setup Request message or a UE Context Modification Request message to setup bearer for the first transmission for the MBS. For example, the UE Context Setup Request message or the UE Context Modification Request message may include the information for the MBS included in the PDU Session Request message.

For example, the CU may receive, from the DU, a UE Context Setup Response message or a UE Context Modification Response message in response to the UE Context Setup Request message or the UE Context Modification Request message.

For example, the CU may transmit, to the DU, a DL RRC Message Transfer message containing the RRC Reconfiguration with the configuration of bearer for the MBS.

For example, upon receiving the message from the CU, the DU may forward the RRC Reconfiguration to the wireless device.

For example, the wireless device may transmit the RRC Reconfiguration Complete to the DU.

For example, the DU may transmit, to the CU, the UL RRC Message Transfer message to forward the RRC Reconfiguration Complete received from the wireless device.

For example, the CU may transmit, to the core network node, a PDU Session Resource Setup Response or a PDU Session Resource Modify Response message including the Information for the MBS, upon establishing the connection with the first wireless device and the second wireless device for the MBS.

In step S1202, the CU may provide, via the DU, the MBS to the first wireless device by using a first transmission.

For example, the first transmission may be one of unicast transmission or multicast transmission, and a third transmission may be another one of unicast transmission or multicast transmission. For example, the first transmission may be unicast transmission and the third transmission may be multicast transmission. For example, the first transmission may be multicast transmission and the third transmission may be unicast transmission.

In step S1203, the CU may providing, via the DU, the MBS to the second wireless device by using a second transmission;

For example, the second transmission may be one of unicast transmission or multicast transmission, and a fourth transmission may be another one of unicast transmission or multicast transmission. For example, the second transmission may be unicast transmission and the fourth transmission may be multicast transmission. For example, the second transmission may be multicast transmission and the fourth transmission may be unicast transmission.

In step S1204, the CU may receive, from the DU, a first switching message including status of the MBS for each of the first wireless device and the second wireless device.

For example, the first switching message may include an identity (ID) of the MBS.

According to some embodiments of the present disclosure, the status of the MBS may include at least one of (1) a ratio of positive acknowledgement (ACK) to negative acknowledgement (NACK) in response to the MBS, (2) the fraction of NACK in response to the MBS, and/or (3) the fraction of ACK in response to the MBS.

For example, the ACK and NACK may be a Hybrid Automatic Repeat Request (HARQ) ACK and HARQ NACK from a wireless device.

For other example, the ACK and NACK may be ACK and NACK from radio link control (RLC) layer of a wireless device.

According to some embodiments of the present disclosure, the status of the MBS may be generated by the DU based on feedback information from each of the first wireless device and the second wireless device in response to the provided MBS.

For example, the feedback information may include layer 1 basis feedback information or layer 2 basis feedback information in response to the provided MBS.

For example, the feedback information may include at least one of (1) Hybrid Automatic Repeat Request (HARQ) positive acknowledgement (ACK) information for the MBS, (2) HARQ negative acknowledgement (NACK) information for the MBS, (3) ACK information from radio link control (RLC) layer for the MBS, and/or (4) NACK information from RLC layer for the MBS.

According to some embodiments of the present disclosure, the first switching message may include a Radio Utilization Efficiency for the MBS.

For example, the Radio Utilization Efficiency for the MBS may include at least one of (1) A: a total amount of radio resources to be used for the multicast transmission, (2) B: a total amount of radio resources to be used for unicast transmission for all wireless devices receiving the MBS, and/or (3) a ratio of A to B.

In step S1205, the CU may determine to switch the first transmission to a third transmission only for the first wireless device for the MBS, based on the received status of the MBS.

For example, the CU may determine not to switch the second transmission to the fourth transmission for the second device for the MBS, based on the received status of the MBS.

According to some embodiments of the present disclosure, the CU may transmit, to the DU, a second switching message including a switching indication to inform the switching from the first transmission to the third transmission for the first wireless device for the MBS.

For example, the second switching message may be transmitted to the DU upon determining to switch the first transmission to the third transmission only for the first wireless device for the MBS.

For example, the second switching message may include an identity of the MBS.

For example, the CU may receive, from the DU, a third switching message including (1) channel information for the MBS, and (2) an identity of the MBS, in response to the second switching message.

For example, the third switching message may be transmitted based on that allocating radio resource for the third transmission is allowable.

For example, the DU may check whether the allocating radio resource for the third transmission is allowable or not upon receiving the second switching message. Then, the DU may inform the CU, by the third message, that the allocating radio resource for the third transmission is allowable.

In step S1206, the CU may providing, via the DU, the MBS by using the third transmission to the first wireless device, For example, the CU may maintain to provide, via the DU, the MBS by using the second transmission to the second wireless device.

According to some embodiments of the present disclosure, the first wireless device and the second wireless device may receive the MBS via a same type of transmission.

In this case, the CU may determine to switch the transmission type of the MBS only for the first wireless device. Then, the CU may provide the MBS to the first wireless device via other transmission type, and maintain to provide the MBS to the second wireless device.

For example, the first wireless device and the second wireless device may receive the MBS via multicast transmission. In this case, the CU may determine to switch the multicast transmission to unicast transmission only for the first wireless device. Then, the CU may provide the MBS to the first wireless device via unicast transmission, and maintain to provide the MBS to the second wireless device via the multicast transmission.

For other example, the first wireless device and the second wireless device may receive the MBS via unicast transmission, respectively. In this case, the CU may determine to switch the unicast to multicast transmission only for the first wireless device. Then, the CU may provide the MBS to the first wireless device via multicast transmission, and maintain to provide the MBS to the second wireless device via the unicast transmission.

According to some embodiments of the present disclosure, the first wireless device and the second wireless device may receive the MBS via a different type of transmission.

In this case, the CU may determine to switch the transmission type of the MBS only for the first wireless device. Then, the CU may provide the MBS to the first wireless device and the second wireless device via same transmission type.

For example, the first wireless device may receive the MBS via multicast transmission and the second wireless device may receive the MBS via unicast transmission. In this case, the CU may determine to switch the multicast transmission to unicast transmission only for the first wireless device. Then, the CU may provide the MBS to the first wireless device and the second wireless device via unicast transmission, respectively.

For example, the first wireless device may receive the MBS via unicast transmission and the second wireless device may receive the MBS via multicast transmission. In this case, the CU may determine to switch the unicast transmission to multicast transmission only for the first wireless device. Then, the CU may provide the MBS to the first wireless device and the second wireless device via multicast transmission together.

According to some embodiments of the present disclosure, a network (for example, a base station) may support RAN basic functions for broadcast/multicast for UEs in RRC_CONNECTED state.

For example, a network may support a group scheduling mechanism to allow UEs to receive Broadcast/Multicast service. For example, a network may support necessary enhancements that are required to enable simultaneous operation with unicast reception.

For example, a network may support for dynamic change of Broadcast/Multicast service delivery between multicast (PTM) and unicast (PTP) with service continuity for a given UE.

For example, a network may support for basic mobility with service continuity.

For example, a network may assume that the necessary coordination function (like functions hosted by MCE) resides in the gNB-CU. For example, a network may support required changes on the RAN architecture and interfaces, considering the results of the SA2 SI on Broadcast/Multicast.

For example, a network may support required changes to improve reliability of Broadcast/Multicast service, for example, by UL feedback. The level of reliability may be based on the requirements of the application/service provided.

For example, a network may support for dynamic control of the Broadcast/Multicast transmission area within one gNB-DU and specify what is needed to enable it.

According to some embodiments of the present disclosure, a network (for example, a base station) may support RAN basic functions for broadcast/multicast for UEs in RRC_IDLE/RRC_INACTIVE states.

According to some embodiments of the present disclosure, a network (for example, a base station) may support required changes to enable the reception of Point to Multipoint transmissions by UEs in RRC_IDLE/RRC_INAC- TIVE states, with the aim of keeping maximum commonality between RRC_CONNECTED state and RRC_IDLE/RRC_INACTIVE state for the configuration of PTM reception.

The possibility of receiving Point to Multipoint transmissions by UEs in RRC_IDLE/RRC_INACTIVE states, without the need for those UEs to get the configuration of the PTM bearer carrying the Broadcast/Multicast service while in RRC CONNECTED state beforehand, may be supported by the network to verification of service subscription and authorization assumptions.

According to some embodiments of the present disclosure, a network (for example, a base station) may support a high level MBS architecture, with the further restriction that only NR in NG-RAN (for example, connected to 5GC) is considered as RAT.

For example, a network may provide Multicast/Broadcast transmissions in FR2.

For example, a network may support flexible resource allocation between Unicast and Broadcast/Multicast services.

Hereinafter, a method for switching between unicast and multicast by considering degraded user experience performed by a gNB-DU and a gNB-CU in a wireless communication system, according to some embodiments of the present disclosure, will be described.

For example, a gNB-DU may provide the gNB-CU with the information on (1) the layer 1 status or the layer 2 status per UE per multicast and/or broadcast service (MBS), and/or (2) the radio utilization efficiency per MBS based on its radio situation and UE's layer 1 basis feedback information and/or later 2 basis feedback information for the multicast and/or broadcast data transmission of the MBS.

For example, based on the received information, the gNB-CU may determine whether to perform switching between unicast and multicast for the MBS and/or a part of UEs receiving the MBS.

For example, the gNB-DU may provide the gNB-CU with multicast and/or broadcast channel information for the MBS in case of unicast to multicast switching in order to offer this information to the UE(s) provided with the MBS.

For example, the gNB-CU may provide the gNB-DU with the MBS identity (for example, service identity, and/or MBS flow identity) when the AMF requests establishing PDU session or QoS flow for the MBS.

Figure 13A:
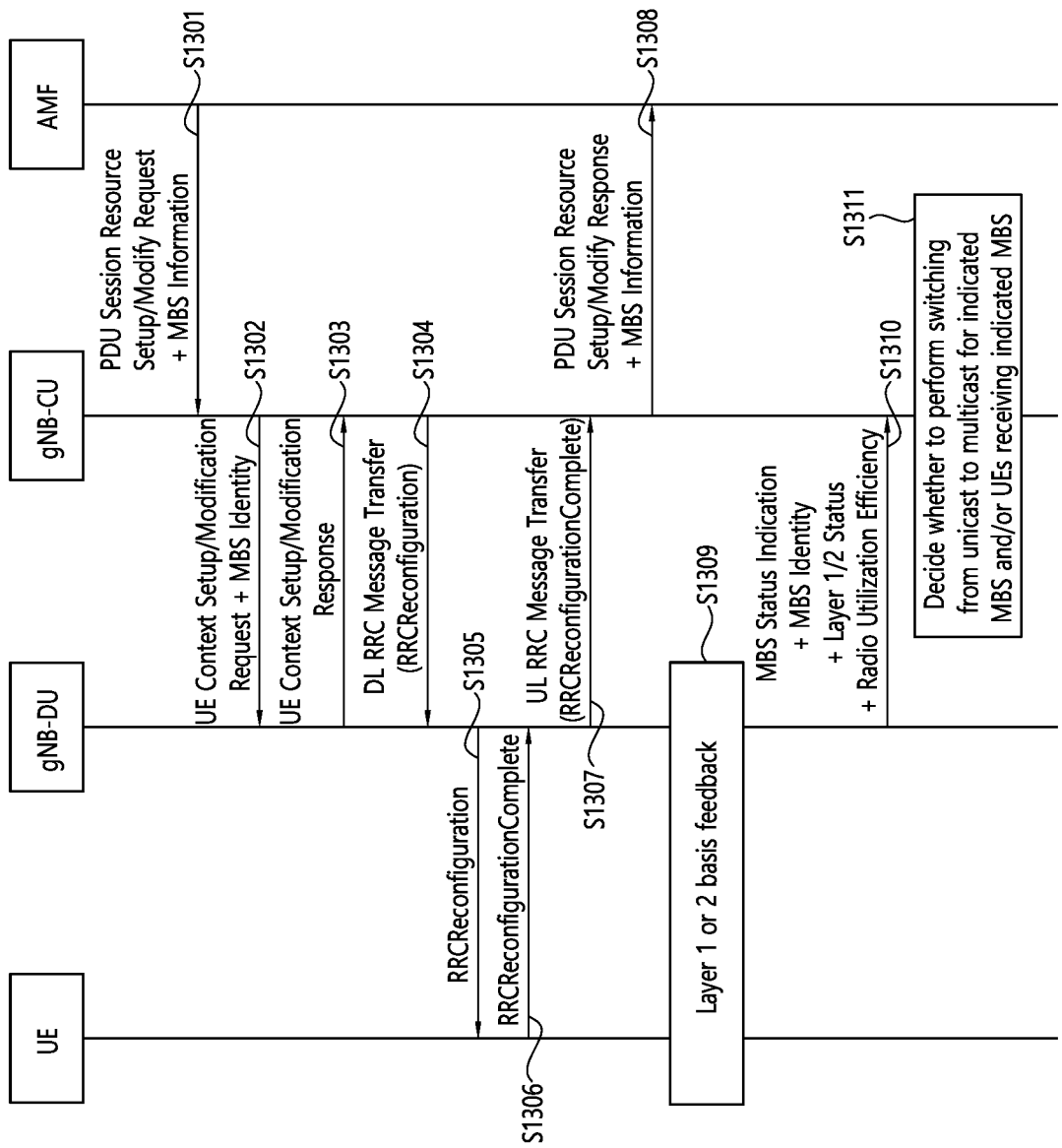
FIGS. 13A, 13B, and 13C show an example of a procedure for switching between unicast and multicast by considering degraded user experience in a wireless communication system, according to some embodiments of the present disclosure.
Figure 13B:
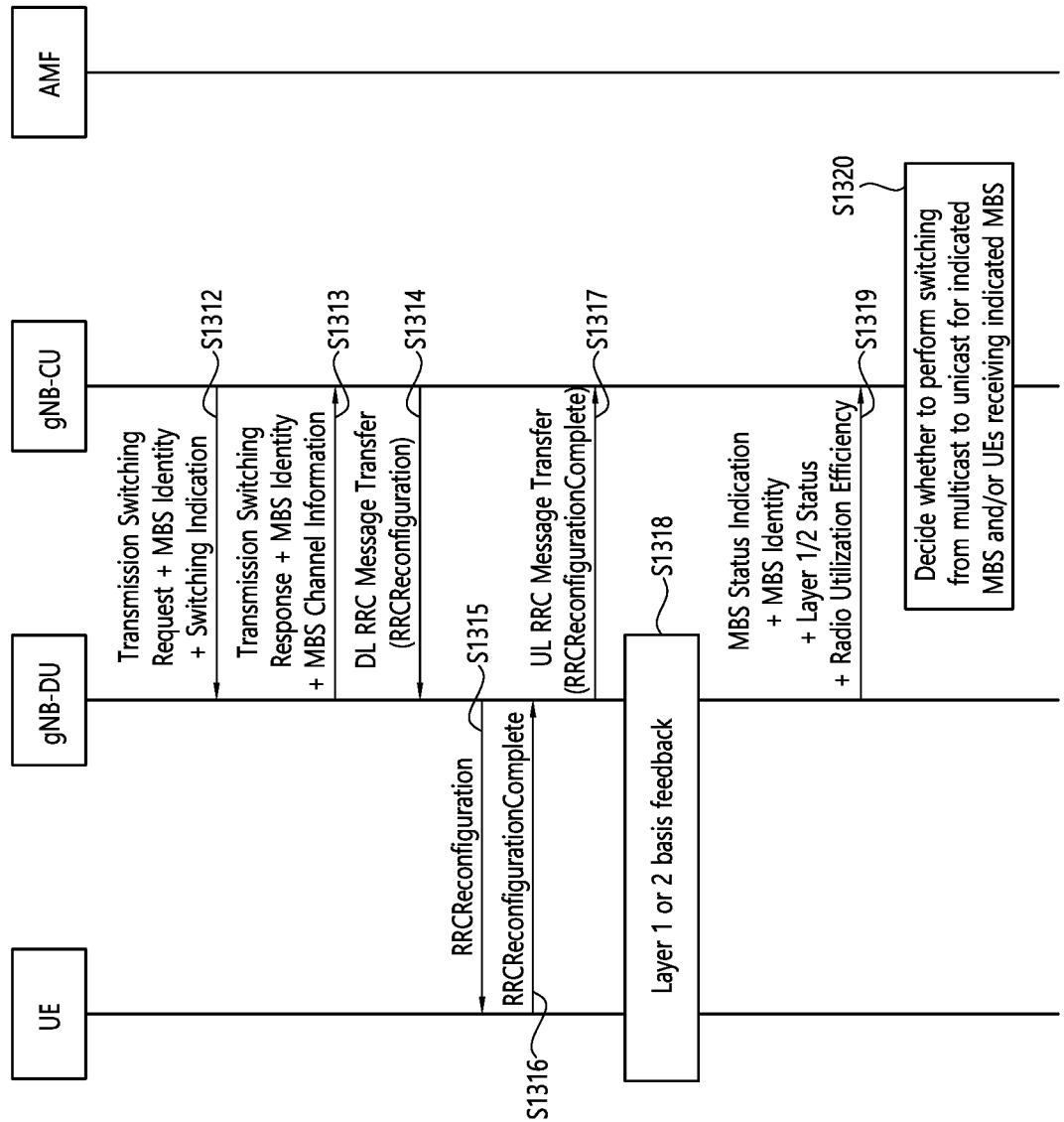
Figure 13C:
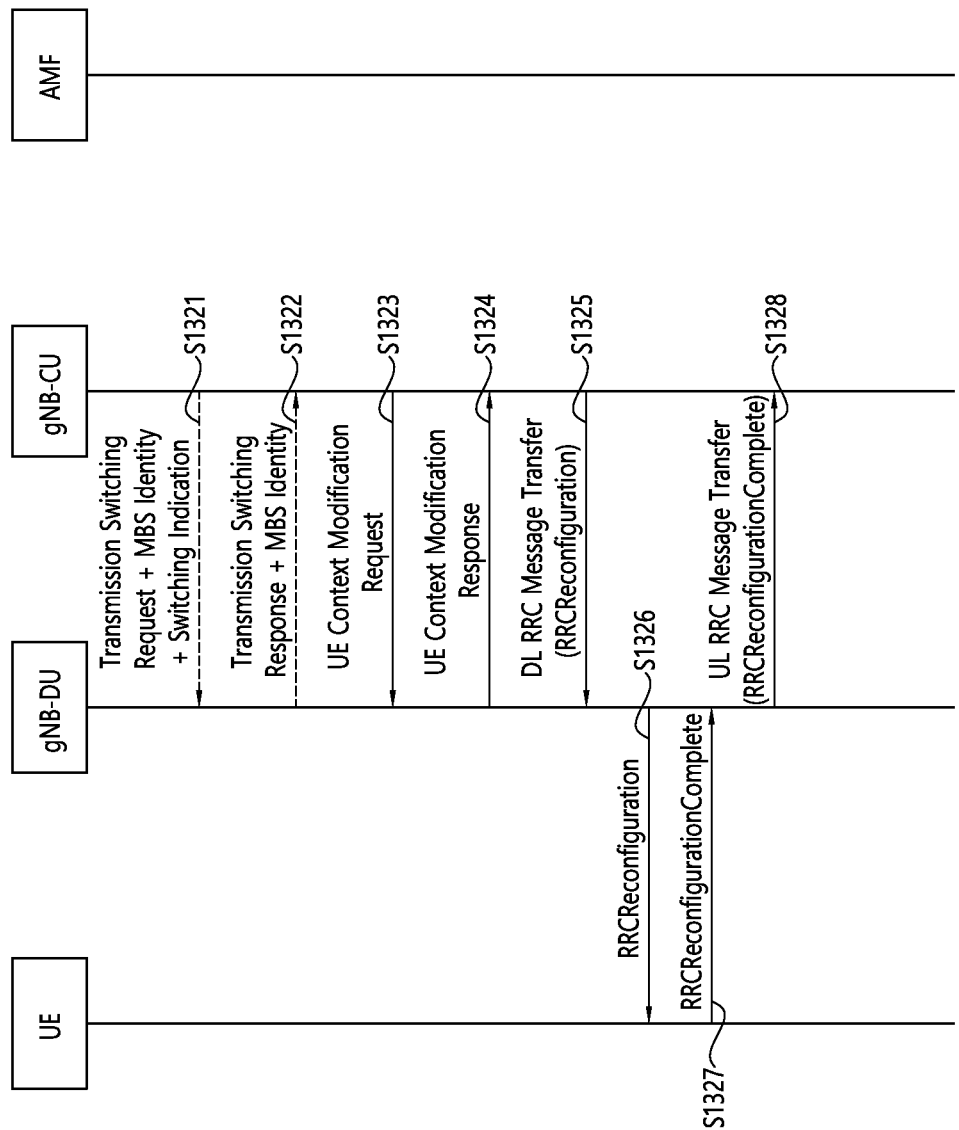

FIGS. 13A, 13B, and 13C show an example of a procedure for switching between unicast and multicast by considering degraded user experience in a wireless communication system, according to some embodiments of the present disclosure.

In steps S1301 to S1317, a procedure for switching from unicast to multicast may be performed.

In step S1301, the AMF may send the PDU Session Resource Setup Request or the PDU Session Resource Modify Request message to the gNB-CU in order to establish the PDU session or setup QoS flow for multicast and/or broadcast data transmission. This message may include the MBS Information, for example, service identity, MBS TEID, multicast address, and/or MBS flow identity, to indicate the MBS provided through the PDU session or QoS flow to be established.

In step S1302, on receiving the setup or modify request message, the gNB-CU may store the received MBS related information. Then, the gNB-CU may transmit, to the gNB-DU, the UE Context Setup Request or the UE Context Modification Request in order to request the setup of bearer for multicast and/or broadcast data transmission. This message may contain the MBS Identity, for example, service identity and/or MBS flow identity, to indicate that the requested bearer is related to which MBS.

In step S1303, when the gNB-DU receives the setup or modification request message, the gNB-DU can identify the MBS to be provided to the UE through the request bearer. Also, the gNB-DU may know the number of UEs provided with the MBS or interested in the MBS. Including the configuration for requested bearer, the gNB-DU may respond with the UE Context Setup Response or the UE Context Modification Response message to the gNB-CU.

In step S1304, the gNB-CU may send the DL RRC Message Transfer message containing the RRCReconfiguration with the configuration of bearer for multicast and/or broadcast data transmission to the gNB-DU.

In step S1305, upon the receipt of the message from the gNB-CU, the gNB-DU may forward the RRCReconfiguration to the UE.

In step S1306, the UE may transmit the RRCReconfigurationComplete to the gNB-DU.

In step S1307, on receiving the message from the UE, the gNB-DU may send the UL RRC Message Transfer message to the gNB-CU to forward the RRCReconfigurationComplete received from the UE.

In step S1308, when the gNB-CU receives the message from the gNB-DU, the gNB-CU may transmit to the AMF the PDU Session Resource Setup Response or the PDU Session Resource Modify Response message. This message may include the MBS Information, for example, service identity, MBS TEID (downlink), and/or MBS flow identity, to indicate the MBS which the AMF requests.

In step S1309, for the MBS, the UE may send layer 1 basis feedback information and/or layer 2 basis feedback information, for example, (1) HARQ ACK information and/or HARQ NACK information for downlink multicast and/or broadcast data transmission, and/or (2) the ACK/NACK information of RLC of bearer for downlink multicast and/or broadcast data transmission.

In step S1310, based on layer 1 or 2 basis feedback information for the MBS, the gNB-DU may derive the ratio of ACK to NACK, the fraction of NACK, and/or the fraction of ACK per UE. For example, the gNB-DU may derive the status or statistics aggregating per UE layer 1 or 2 feedback status/statistics across all of UEs receiving the same MBS.

The gNB-DU may transmit, to the gNB-CU, the MBS Status Indication, existing, or new message in order to inform of status for the MBS. This message may include the MBS Identity to indicate that the provided information is related to which MBS. This message may contain the Layer 1/2 Status, for example, (1) the ratio of ACK to NACK, (2) the fraction of NACK, (3) the fraction of ACK per UE per MBS, and/or (4) per MBS status or statistics aggregating per UE layer 1 or 2 feedback status/statistics across all of UEs receiving the same MBS.

This message may include the Radio Utilization Efficiency per MBS, for example, (1) A: the (expected) total amount of radio resources (to be) used for multicast/broadcast, (2) B: the (expected) total amount of radio resources (to be) used for unicast by all of UEs receiving the same MBS, and/or (3) the ratio of A to B.

In step S1311, upon receipt of the message from the gNB-DU, based on per MBS information, the gNB-CU may determine whether to perform switching from unicast to multicast for an indicated MBS. Based on per UE information, the gNB-CU may decide not to perform switching from unicast to multicast for a part of UEs receiving an indicated MBS because of degradation of user experiences. For these UEs, step S1314 to step S1317 may be skipped.

In step S1312, in order to request the switching from unicast to multicast, the gNB-CU may send the Transmission Switching Request, existing, or new message to the gNB-DU. This message may include the MBS Identity to indicate the MBS to be switched. In addition, this message may contain the Switching Indication to inform the gNB-DU of the unicast to multicast switching.

In step S1313, on receiving the message from the gNB-CU, the gNB-DU may check whether to be able to allocate the radio resource for multicast for indicated MBS. If available, the gNB-DU may respond with the Transmission Switching Response, existing, or new message to the gNB-CU. This message may include the MBS Channel Information and the MBS Identity to provide multicast channel information to the UE(s) provided with the indicated MBS.

In step S1314, when to receive the message from the gNB-DU, the gNB-CU may store the MBS Channel Information to provide to the UE(s) which may perform switching from unicast to multicast later. The gNB-CU may transmit, to the gNB-DU, the DL RRC Message Transfer message with the RRCReconfiguration in order to provide the multicast channel related information to the UE provided with the indicated MBS. If there are multiple UEs provided with the indicated MBS, the gNB-CU may send this F1 AP message with the RRCReconfiguration to all of those UEs except the UEs not performing switching from unicast to multicast.

In step S1315, upon the receipt of the message from the gNB-CU, the gNB-DU may forward the RRCReconfiguration to the UE.

In step S1316, the UE may transmit the RRCReconfigurationComplete to the gNB-DU.

In step S1317, on receiving the message from the UE, the gNB-DU may send, to the gNB-CU, the UL RRC Message Transfer message to forward the RRCReconfigurationComplete received from the UE.

In steps S1318 to S1328, a procedure for switching from multicast to unicast may be performed.

In step S1318, for the MBS, the UE may send layer 1 or 2 basis feedback information, for example, (1) HARQ ACK/NACK information for downlink multicast/broadcast data transmission or (2) the ACK/NACK information of RLC of bearer for downlink multicast/broadcast data transmission.

In step S1319, based on layer 1 or 2 basis feedback information for the MBS, the gNB-DU may derive (1) the ratio of ACK to NACK, (2) the fraction of NACK, and/or (3) the fraction of ACK per UE. For example, the gNB-DU may derive the status or statistics aggregating per UE layer 1 or 2 feedback status/statistics across all of UEs receiving the same MBS.

The gNB-DU may transmit, to the gNB-CU, the MBS Status Indication, existing, or new message in order to inform of status for the MBS. This message may include the MBS Identity to indicate that the provided information is related to which MBS. This message may contain the Layer 1/2 Status, for example, (1) the ratio of ACK to NACK, (2) the fraction of NACK, (3) the fraction of ACK per UE per MBS, and/or (4) per MBS status or statistics aggregating per UE layer 1 or 2 feedback status/statistics across all of UEs receiving the same MBS. This message may include the Radio Utilization Efficiency per MBS, for example, (1) A: the (expected) total amount of radio resources (to be) used for multicast/broadcast, (2) B: the (expected) total amount of radio resources (to be) used for unicast by all of UEs receiving the same MBS, and/or (3) the ratio of A to B.

In step S1320, upon receipt of the message from the gNB-DU, based on per MBS information, the gNB-CU may determine whether to perform switching from multicast to unicast for an indicated MBS. If not possible, steps S1321 and S1322 may be skipped. Though the multicast to unicast switching cannot be performed, based on per UE information, the gNB-CU may decide to perform switching from multicast to unicast for a part of UEs receiving an indicated MBS because of degradation of user experiences.

In step S1321, in order to request the switching from multicast to unicast for an indicated MBS, the gNB-CU may send the Transmission Switching Request, existing, or new message to the gNB-DU. This message may include the MBS Identity to indicate the MBS to be switched. In addition, this message may contain the Switching Indication to inform the gNB-DU of the multicast to unicast switching.

In step S1322, on receiving the message from the gNB-CU, the gNB-DU may check whether to be able to allocate the radio resource for unicast for indicated MBS. If available, the gNB-DU may respond with the Transmission Switching Response, existing, or new message to the gNB-CU. This message may include the MBS Identity to indicate the MBS to be switched from multicast to unicast. For example, the gNB-DU may release the radio resource for multicast related to the indicated MBS.

In step S1323, when the gNB-CU receives the response message from the gNB-DU or to decide to perform switching from multicast to unicast for a part of UEs receiving an indicated MBS in step S1320, the gNB-CU may transmit the UE Context Modification Request message to the UE provided with the MBS indicated by the gNB-DU. This signalling may be in order to request establishing or modifying the bearer configuration to be used for unicast transmission of multicast/broadcast data. If there are multiple UEs provided with the indicated MBS, the gNB-CU may send this F1AP message to all of those UEs.

In step S1324, on receiving the request from the gNB-CU, the gNB-DU may configure the requested bearer based on the current radio situation and send the UE Context Modification Response message to the gNB-CU.

In step S1325, the gNB-CU may send, to the gNB-DU, the DL RRC Message Transfer message containing the RRCReconfiguration with the configuration of bearer for multicast/broadcast data transmission.

In step S1326, upon the receipt of the message from the gNB-CU, the gNB-DU may forward the RRCReconfiguration to the UE.

In step S1327, the UE may transmit the RRCReconfigurationComplete to the gNB-DU.

In step S1328, on receiving the message from the UE, the gNB-DU may send the UL RRC Message Transfer message to the gNB-CU to forward the RRCReconfigurationComplete received from the UE.

Hereinafter, an apparatus for switching between unicast and multicast by considering degraded user experience in a wireless communication system, according to some embodiments of the present disclosure, will be described.

For example, a Central Unit (CU) of a Radio Access Network (RAN) node may include a processor, and a memory.

According to some embodiments of the present disclosure, the processor may be configured to be coupled operably with the memory.

The processor may be configured to establish, via a DU of the RAN node, connection with a first wireless device and a second wireless device for a Multicast and/or Broadcast Service (MBS). The processor may be configured to provide, via the DU, the MBS to the first wireless device by using a first transmission. The processor may be configured to provide, via the DU, the MBS to the second wireless device by using a second transmission. The processor may be configured to receive, from the DU, a first switching message including status of the MBS for each of the first wireless device and the second wireless device. The processor may be configured to determine to switch the first transmission to a third transmission only for the first wireless device for the MBS, based on the received status of the MBS. The processor may be configured to provide, via the DU, the MBS by using the third transmission to the first wireless device.

For example, the first transmission may be one of unicast transmission or multicast transmission, and the third transmission is another one of unicast transmission or multicast transmission.

The second transmission may be one of unicast transmission or multicast transmission.

For example, the status of the MBS may include at least one of (1) a ratio of positive acknowledgement (ACK) to negative acknowledgement (NACK) in response to the MBS, (2) the fraction of NACK in response to the MBS, and/or (3) the fraction of ACK in response to the MBS.

For example, the status of the MBS may include at least one of status for a layer 1 feedback and/or status for a layer 2 feedback.

According to some embodiments of the present disclosure, the status of the MBS may be generated by the DU based on feedback information from each of the first wireless device and the second wireless device in response to the provided MBS.

For example, the feedback information may include layer 1 basis feedback information or layer 2 basis feedback information in response to the provided MBS.

For example, the feedback information may include at least one of (1) Hybrid Automatic Repeat Request (HARQ) positive acknowledgement (ACK) information for the MBS, (2) HARQ negative acknowledgement (NACK) information for the MBS, (3) ACK information from radio link control (RLC) layer for the MBS, and/or (4) NACK information from RLC layer for the MBS.

According to some embodiments of the present disclosure, the first switching message may include an identity (ID) of the MBS.

For example, the first switching message may include a Radio Utilization Efficiency for the MBS.

For example, the Radio Utilization Efficiency for the MBS may include at least one of (1) A: a total amount of radio resources to be used for the multicast transmission, (2) B: a total amount of radio resources to be used for unicast transmission for all wireless devices receiving the MBS, and/or (3) a ratio of A to B.

According to some embodiments of the present disclosure, the processor may be configured to determine not to switch the second transmission to a fourth transmission for the second device for the MBS, based on the received status of the MBS.

For example, the fourth transmission may be the other one of unicast transmission or multicast transmission other than the second transmission.

According to some embodiments of the present disclosure, the processor may be configured to transmit, to the DU, a second switching message including a switching indication to inform the switching from the first transmission to the third transmission for the first wireless device for the MBS.

For example, the second switching message may include an identity of the MBS.

For example, the processor may be configured to receive, from the DU, a third switching message including (1) channel information for the MBS, and (2) an identity of the MBS, in response to the second switching message.

For example, the third switching message may be transmitted based on that allocating radio resource for the third transmission is allowable.

For example, referring to FIG. 10, a gNB-CU could be an example of the CU of a RAN node for switching between unicast and multicast by considering degraded user experience.

Hereinafter, a processor for a Central Unit (CU) for switching between unicast and multicast by considering degraded user experience in a wireless communication system, according to some embodiments of the present disclosure, will be described.

The processor may be configured to control the CU to establish, via a DU of the RAN node, connection with a first wireless device and a second wireless device for a Multicast and/or Broadcast Service (MBS). The processor may be configured to control the CU to provide, via the DU, the MBS to the first wireless device by using a first transmission. The processor may be configured to control the CU to provide, via the DU, the MBS to the second wireless device by using a second transmission. The processor may be configured to control the CU to receive, from the DU, a first switching message including status of the MBS for each of the first wireless device and the second wireless device. The processor may be configured to control the CU to determine to switch the first transmission to a third transmission only for the first wireless device for the MBS, based on the received status of the MBS. The processor may be configured to control the CU to provide, via the DU, the MBS by using the third transmission to the first wireless device.

For example, the first transmission may be one of unicast transmission or multicast transmission, and the third transmission is another one of unicast transmission or multicast transmission.

The second transmission may be one of unicast transmission or multicast transmission.

For example, the status of the MBS may include at least one of (1) a ratio of positive acknowledgement (ACK) to negative acknowledgement (NACK) in response to the MBS, (2) the fraction of NACK in response to the MBS, and/or (3) the fraction of ACK in response to the MBS.

For example, the status of the MBS may include at least one of status for a layer 1 feedback and/or status for a layer 2 feedback.

According to some embodiments of the present disclosure, the status of the MBS may be generated by the DU based on feedback information from each of the first wireless device and the second wireless device in response to the provided MBS.

For example, the feedback information may include layer 1 basis feedback information or layer 2 basis feedback information in response to the provided MBS.

For example, the feedback information may include at least one of (1) Hybrid Automatic Repeat Request (HARQ) positive acknowledgement (ACK) information for the MBS, (2) HARQ negative acknowledgement (NACK) information for the MBS, (3) ACK information from radio link control (RLC) layer for the MBS, and/or (4) NACK information from RLC layer for the MBS.

According to some embodiments of the present disclosure, the first switching message may include an identity (ID) of the MBS.

For example, the first switching message may include a Radio Utilization Efficiency for the MBS.

For example, the Radio Utilization Efficiency for the MBS may include at least one of (1) A: a total amount of radio resources to be used for the multicast transmission, (2) B: a total amount of radio resources to be used for unicast transmission for all wireless devices receiving the MBS, and/or (3) a ratio of A to B.

According to some embodiments of the present disclosure, the processor may be configured to control the CU to determine not to switch the second transmission to a fourth transmission for the second device for the MBS, based on the received status of the MBS.

For example, the fourth transmission may be the other one of unicast transmission or multicast transmission other than the second transmission.

According to some embodiments of the present disclosure, the processor may be configured to control the CU to transmit, to the DU, a second switching message including a switching indication to inform the switching from the first transmission to the third transmission for the first wireless device for the MBS.

For example, the second switching message may include an identity of the MBS.

For example, the processor may be configured to control the CU to receive, from the DU, a third switching message including (1) channel information for the MBS, and (2) an identity of the MBS, in response to the second switching message.

For example, the third switching message may be transmitted based on that allocating radio resource for the third transmission is allowable.

Hereinafter, a non-transitory computer-readable medium has stored thereon a plurality of instructions for switching between unicast and multicast by considering degraded user experience in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a Central Unit (CU).

The stored a plurality of instructions may cause the CU to establish, via a DU of the RAN node, connection with a first wireless device and a second wireless device for a Multicast and/or Broadcast Service (MBS). The stored a plurality of instructions may cause the CU to provide, via the DU, the MBS to the first wireless device by using a first transmission. The stored a plurality of instructions may cause the CU to provide, via the DU, the MBS to the second wireless device by using a second transmission. The stored a plurality of instructions may cause the CU to receive, from the DU, a first switching message including status of the MBS for each of the first wireless device and the second wireless device. The stored a plurality of instructions may cause the CU to determine to switch the first transmission to a third transmission only for the first wireless device for the MBS, based on the received status of the MBS. The stored a plurality of instructions may cause the CU to provide, via the DU, the MBS by using the third transmission to the first wireless device.

For example, the first transmission may be one of unicast transmission or multicast transmission, and the third transmission is another one of unicast transmission or multicast transmission.

The second transmission may be one of unicast transmission or multicast transmission.

For example, the status of the MBS may include at least one of (1) a ratio of positive acknowledgement (ACK) to negative acknowledgement (NACK) in response to the MBS, (2) the fraction of NACK in response to the MBS, and/or (3) the fraction of ACK in response to the MBS.

For example, the status of the MBS may include at least one of status for a layer 1 feedback and/or status for a layer 2 feedback.

According to some embodiments of the present disclosure, the status of the MBS may be generated by the DU based on feedback information from each of the first wireless device and the second wireless device in response to the provided MBS.

For example, the feedback information may include layer 1 basis feedback information or layer 2 basis feedback information in response to the provided MBS.

For example, the feedback information may include at least one of (1) Hybrid Automatic Repeat Request (HARQ) positive acknowledgement (ACK) information for the MBS, (2) HARQ negative acknowledgement (NACK) information for the MBS, (3) ACK information from radio link control (RLC) layer for the MBS, and/or (4) NACK information from RLC layer for the MBS.

According to some embodiments of the present disclosure, the first switching message may include an identity (ID) of the MBS.

For example, the first switching message may include a Radio Utilization Efficiency for the MBS.

For example, the Radio Utilization Efficiency for the MBS may include at least one of (1) A: a total amount of radio resources to be used for the multicast transmission, (2) B: a total amount of radio resources to be used for unicast transmission for all wireless devices receiving the MBS, and/or (3) a ratio of A to B.

According to some embodiments of the present disclosure, the stored a plurality of instructions may cause the CU to determine not to switch the second transmission to a fourth transmission for the second device for the MBS, based on the received status of the MBS.

For example, the fourth transmission may be the other one of unicast transmission or multicast transmission other than the second transmission.

According to some embodiments of the present disclosure, the stored a plurality of instructions may cause the CU to transmit, to the DU, a second switching message including a switching indication to inform the switching from the first transmission to the third transmission for the first wireless device for the MBS.

For example, the second switching message may include an identity of the MBS.

For example, the stored a plurality of instructions may cause the CU to receive, from the DU, a third switching message including (1) channel information for the MBS, and (2) an identity of the MBS, in response to the second switching message.

For example, the third switching message may be transmitted based on that allocating radio resource for the third transmission is allowable.

The present disclosure may have various advantageous effects.

According to some embodiments of the present disclosure, a Radio Access Network (RAN) node (for example, a base station such as an eNB or a gNB) could efficiently switch between unicast and multicast for multicast and/or broad cast service (MBS) by considering degraded user experience.

For example, a gNB-Central Unit (CU) could efficiently perform switching between unicast and multicast for the MBS based on the information on layer 1 status and/or layer 2 status and radio utilization efficiency provided from a gNB-Distributed Unit (DU).

For example, by considering the layer 1 status and/or the layer 2 status information, it is possible to perform switching for a part of UEs receiving the same MBS.

Therefore, the RAN node could use radio resource for the MBS efficiently. In addition, the RAN node could avoid the degradation of user experiences by switching between unicast and multicast.

According to some embodiments of the present disclosure, a wireless communication system could provide an efficient solution for dynamic change of MBS delivery between multicast and unicast with service continuity by considering degraded user experience.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a Central Unit (CU) of a Radio Access Network (RAN) node in a wireless communication system, the method comprising,
   establishing, via a DU of the RAN node, connection with a first wireless device and a second wireless device for a Multicast and/or Broadcast Service (MBS);
   providing, via the DU, the MBS to the first wireless device by using a first transmission;
   providing, via the DU, the MBS to the second wireless device by using a second transmission;
   receiving, from the DU, a first switching message including status of the MBS for each of the first wireless device and the second wireless device;
   determining to switch the first transmission to a third transmission only for the first wireless device for the MBS, based on the received status of the MBS; and
   providing, via the DU, the MBS by using the third transmission to the first wireless device,
   wherein the first transmission is one of unicast transmission or multicast transmission, and the third transmission is another one of unicast transmission or multicast transmission, and
   wherein the second transmission is one of unicast transmission or multicast transmission.

2. The method of claim 1, wherein the status of the MBS includes at least one of (1) a ratio of positive acknowledgement (ACK) to negative acknowledgement (NACK) in response to the MBS, (2) the fraction of NACK in response to the MBS, and/or (3) the fraction of ACK in response to the MBS.

3. The method of claim 1, wherein the status of the MBS includes at least one of status for a layer 1 feedback and/or status for a layer 2 feedback.

4. The method of claim 1, wherein the status of the MBS is generated by the DU based on feedback information from each of the first wireless device and the second wireless device in response to the provided MBS.

5. The method of claim 4, wherein the feedback information includes layer 1 basis feedback information or layer 2 basis feedback information in response to the provided MBS.

6. The method of claim 4, wherein the feedback information includes at least one of (1) Hybrid Automatic Repeat Request (HARQ) positive acknowledgement (ACK) information for the MBS, (2) HARQ negative acknowledgement (NACK) information for the MBS, (3) ACK information from radio link control (RLC) layer for the MBS, and/or (4) NACK information from RLC layer for the MBS.

7. The method of claim 1, the first switching message includes an identity (ID) of the MBS.

8. The method of claim 1, wherein the first switching message includes a Radio Utilization Efficiency for the MBS.

9. The method of claim 8, wherein the Radio Utilization Efficiency for the MBS includes at least one of (1) A: a total amount of radio resources to be used for the multicast transmission, (2) B: a total amount of radio resources to be used for unicast transmission for all wireless devices receiving the MBS, and/or (3) a ratio of A to B.

10. The method of claim 1, wherein the method further comprises,
determining not to switch the second transmission to a fourth transmission for the second device for the MBS, based on the received status of the MBS,
wherein the fourth transmission is the other one of unicast transmission or multicast transmission other than the second transmission.

11. The method of claim 1, wherein the method further comprises,
transmitting, to the DU, a second switching message including a switching indication to inform the switching from the first transmission to the third transmission for the first wireless device for the MBS.

12. The method of claim 11, wherein the second switching message includes an identity of the MBS.

13. The method of claim 1, wherein the method further comprises,
receiving, from the DU, a third switching message including (1) channel information for the MBS, and (2) an identity of the MBS, in response to the second switching message.

14. The method of claim 13, wherein the third switching message is transmitted based on that allocating radio resource for the third transmission is allowable.

15. A Central Unit (CU) of a Radio Access Network (RAN) node in a wireless communication system comprising:
a memory; and
at least one processor operatively coupled to the memory, and configured to:
establish, via a DU of the RAN node, connection with a first wireless device and a second wireless device for a Multicast and/or Broadcast Service (MBS);
provide, via the DU, the MBS to the first wireless device by using a first transmission;
provide, via the DU, the MBS to the second wireless device by using a second transmission;
receive, from the DU, a first switching message including status of the MBS for each of the first wireless device and the second wireless device;
determine to switch the first transmission to a third transmission only for the first wireless device for the MBS, based on the received status of the MBS; and
provide, via the DU, the MBS by using the third transmission to the first wireless device,
wherein the first transmission is one of unicast transmission or multicast transmission, and the third transmission is another one of unicast transmission or multicast transmission, and
wherein the second transmission is one of unicast transmission or multicast transmission.

16. The CU of the RAN node of claim 15, wherein the status of the MBS includes at least one of (1) a ratio of positive acknowledgement (ACK) to negative acknowledgement (NACK) in response to the MBS, (2) the fraction of NACK in response to the MBS, and/or (3) the fraction of ACK in response to the MBS.

17. The CU of the RAN node of claim 15, wherein the status of the MBS includes at least one of status for a layer 1 feedback and/or status for a layer 2 feedback.

18. The CU of the RAN node of claim 15, wherein the status of the MBS is generated by the DU based on feedback information from each of the first wireless device and the second wireless device in response to the provided MBS.

19. The CU of the RAN node of claim 18, wherein the feedback information includes layer 1 basis feedback information or layer 2 basis feedback information in response to the provided MBS.

20. A non-transitory computer-readable medium having stored thereon a plurality of instructions, which, when executed by a processor of a Central Unit (CU) of a Radio Access Network (RAN) node in a wireless communication system, cause the CU of the RAN node to:
establish, via a DU of the RAN node, connection with a first wireless device and a second wireless device for a Multicast and/or Broadcast Service (MBS);
provide, via the DU, the MBS to the first wireless device by using a first transmission;
provide, via the DU, the MBS to the second wireless device by using a second transmission;
receive, from the DU, a first switching message including status of the MBS for each of the first wireless device and the second wireless device;
determine to switch the first transmission to a third transmission only for the first wireless device for the MBS, based on the received status of the MBS; and
provide, via the DU, the MBS by using the third transmission to the first wireless device,
wherein the first transmission is one of unicast transmission or multicast transmission, and the third transmission is another one of unicast transmission or multicast transmission, and
wherein the second transmission is one of unicast transmission or multicast transmission.

* * * * *